Sept. 4, 1923.

E. D. McCULLOUGH ET AL 1,467,183

ATTACHMENT FOR WAGON DUMPS

Filed Jan. 9, 1922

INVENTORS
E. D. McCullough
A. W. Butcher
BY
Munn & Co.
ATTORNEYS

Patented Sept. 4, 1923.

1,467,183

UNITED STATES PATENT OFFICE.

ELI D. McCULLOUGH AND ARCHIE W. BUTCHER, OF SOLOMON, KANSAS, ASSIGNOR, BY DIRECT AND MESNE ASSIGNMENTS, TO THE GRAVITY DUMP MANUFACTURING COMPANY, A CORPORATION OF KANSAS.

ATTACHMENT FOR WAGON DUMPS.

Application filed January 9, 1922. Serial No. 527,957.

*To all whom it may concern:*

Be it known that we, ELI D. McCULLOUGH and ARCHIE W. BUTCHER, both citizens of the United States, and residents of Solomon, in the county of Dickinson and State of Kansas, have invented a new and useful Improvement in Attachments for Wagon Dumps, of which the following is a full, clear, and exact description.

Our invention relates to improvements in attachments for wagon dumps, and it consists in the combinations, constructions, and arrangements herein described and claimed.

An object of our invention is to provide an attachment for wagon dumps, whereby trucks as well as wagons may be readily dumped.

A further object of our invention is to provide a device of the type described which may be easily attached to a wagon dump of ordinary construction.

A further object of our invention is to provide a device of the type described which has means whereby it may be instantly secured to or released from the wagon dump at will.

A further object of our invention is to provide a device of the type described which is operated by gravity.

A further object of our invention is to provide a device of the type described which is simple in construction, efficient for the purpose intended, and which is not likely to easily get out of order.

Other objects and advantages will appear in the following specification, and the novel features of the invention will be particularly pointed out in the appended claims.

Our invention is illustrated in the accompanying drawings, forming part of this application, in which—

Figure 1:
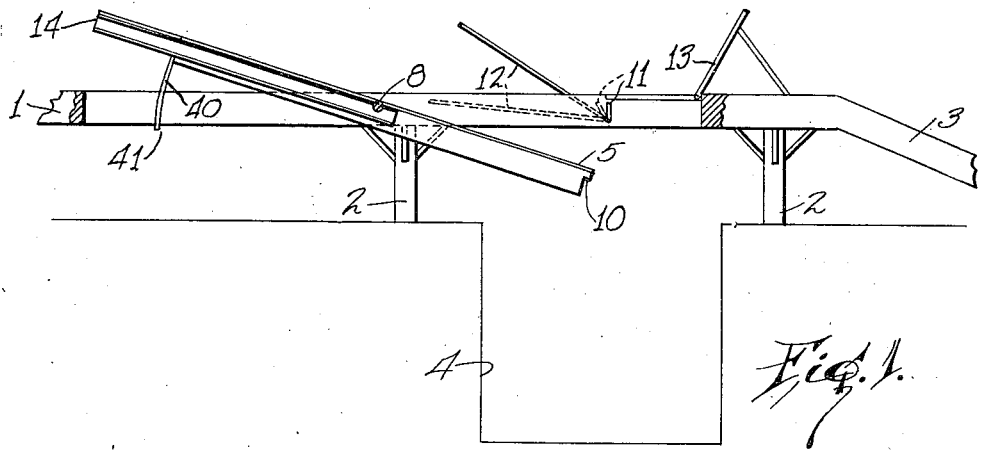
Figure 2:
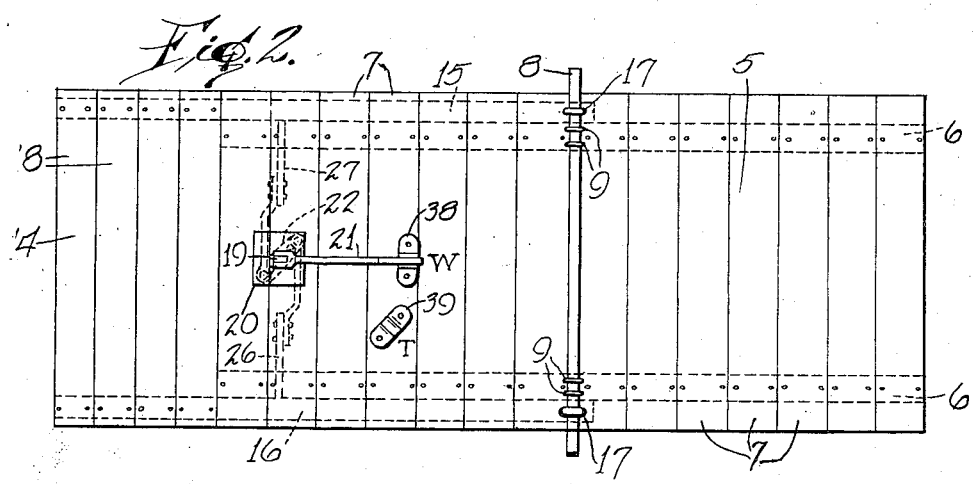
Figure 3:
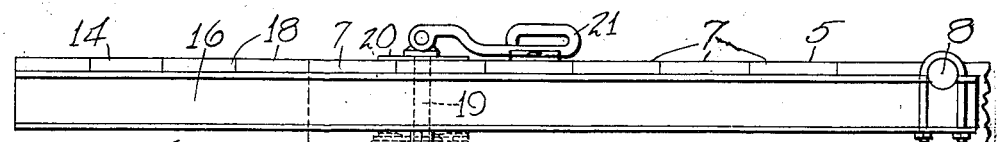
Figures 4, 5:
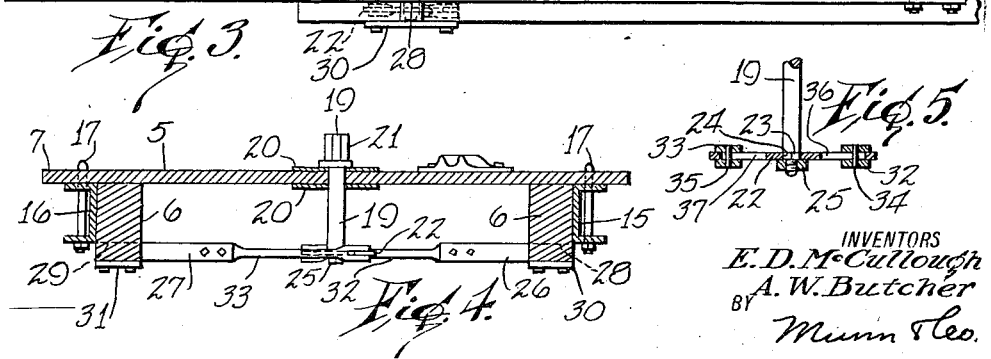

Figure 1 is a diagrammatic view of the device, showing a wagon dump in operative position with the extension attached thereto, Figure 2 is a plan view of the device, Figure 3 is a side elevation of a portion of the device, Figure 4 is an enlarged sectional view of a portion of the device, and Figure 5 is a sectional view of another portion of the device.

In carrying out our invention, we make use of a platform 1 which is supported by legs 2 and has an inclined plane 3 communicating therewith. The platform 1 is disposed over a grain pit 4 and is provided with the ordinary wagon dump 5. It will be observed that the dump 5 is composed of two longitudinally extending members 6 to which are secured transversely extending cleats 7. The members 6 are secured to a pivot rod 8 by means of U-bolts 9 (see Figure 2), the rod 8 being in turn secured or carried by the frame 1. It will be apparent from this construction that the wagon dump 5 can be swung about the rod 8 as a pivot and is adapted to tilt the wagon (not shown) which is carried thereby to the desired angle, whereby the contents of the wagon will be dropped into the pit 4. The ends of the members 6 are provided with a notch 10, which is adapted to normally rest on a locking dog 11, whereby the movement of the dump 5 is prevented. The dog 11 is actuated by means of a handle 12 and when swung into the full line position shown in Figure 1, will release the dump 5 so the latter may be swung into the desired position. The platform 1 is further provided with the ordinary partition 13 which may be swung into the position shown in Figure 1 so as to guide the contents dumped from the wagon into the pit 4. The parts described so far are ordinary in construction and form no part of our invention except in so far as they cooperate with the parts about to be described.

We then provide an extension 14 which is adapted to be locked to the dump 5 at will. The extension comprises two channel irons 15 and 16 which are disposed on the outside of the members 6 and are pivotally secured to the rod 8 by means of U-bolts 17. The free ends of the channel irons 15 and 16 have transversely extending cleats 18 secured thereto. When the extension 14 is disposed in the position shown in Figure 2, the inner cleat thereof is adapted to contact or abut with the outer cleat 7 of the dump 5.

The means for securing the extension 14 to the dump 5 is carried by the dump 5 and consists of a vertically extending bolt 19 which is rotatably carried by plates 20, the latter being secured to the cleats 7. The upper end of the bolt 19 has a handle 21 pivotally secured thereto and carries at its lower end a plate 22. It will be observed from Figure 5 that the lower end of the bolt 19 has a square portion 23 which is received in a square opening 24 of the plate 22. The portion of the bolt projecting beyond the plate 22 is again made cylindrical in shape and is threaded for the reception of a nut 25 thereon. The nut 25 securely locks the plate 22 to the bolt 19 so that a rotative movement of the bolt 19 will swing the plate 22 in a horizontal plane. As clearly shown in Figure 3, the channel irons 15 and 16 are not as wide as the members 6, and this construction permits locking bolts 26 and 27 to be carried by the members 6 and to extend beneath the channel irons 15 and 16, whereby the channel irons are locked to the dump 5. The bolts 26 and 27 are slidably mounted in recesses 28 and 29 in the members 6 and are held in engagement with the recesses by means of strap irons 30 and 31. The bolts 26 and 27 are operatively secured to the plate 22 by means of members 32 and 33 which are secured to the bolts and which are pivotally secured to the plate 22 by means of pins 34 and 35, the pins being slidably disposed in slots 36 and 37 in the plate 22. The dump 5 carries two U-shaped members 38 and 39 which are adapted to receive the free end of the handle 21 (see Figure 2). The member 38 has the character "W" disposed adjacent thereto and the member 39 has the character "T" disposed adjacent thereto. These characters instantly make known to the operator whether the extension 14 is secured to the dump 5 or not, since the character "W" stands for "Wagon" and the character "T" stands for "Truck." The operator previously knows that when the handle 21 is disposed adjacent to "T," that the extension 14 is locked to the dump 5 so as to support the truck which the character "T" designates.

From the foregoing description of the various parts of the device, the operation thereof may be readily understood. Assume that a team of horses has drawn a wagon onto the dump 5. The handle 21 is swung so as to be disposed in the U-shaped member 38. The handle 12 is then raised and the partition 13 is raised to the position shown in Figure 1. The dump 5 is swung by gravity when the handle 12 is raised and automatically swings to the position shown in Figure 1, since the weight of the wagon is disposed adjacent to the end of the dump 5 which is not provided with the extension 14. The dump 5 is prevented from swinging completely about the rod 8, since an arcuate strip 40 of metal, which is carried by the dump 5, is provided with an outwardly turned end 41 which engages the under side of the frame 1. It is obvious that any ordinary construction which will prevent the dump 5 from completely swinging about the rod 8 may be provided and will be as effective for the purpose intended as the strip 40. The dump 5 can further have wheel braces (not shown) disposed thereon by means of which the wagon is prevented from rolling down the inclined dump 5. The contents of the wagon is then readily dumped into the pit 4 and is guided thereinto by means of the partition 13. The dump 5 can then be readily swung back to its normal position and locked in place by the dog 11 so as to permit the wagon to be removed from the dump.

In case a truck is desired to be dumped, the extension 14 is used and is locked to the wagon dump 5 by means of the bolts 26 and 27 which are actuated by the swinging of the handle 21 to the U-shaped member 39. The front wheels of the truck (not shown) will rest on the extension 14 which will be swung into the position shown in Figure 1 with the wagon dump 5.

From the foregoing, it will be readily apparent that we have provided an extension 14 which may be readily attached to a wagon dump of ordinary construction and which can be secured to the wagon dump at will so that the dump can either accommodate a wagon or a truck. The device is very simple in construction and is effective for the purpose intended.

We claim:

1. The combination with a rod, a platform pivotally carried by said rod, locking bolts carried by said platform, and means carried by said platform for moving said bolts transversely with respect to said platform, of an extension platform pivotally carried by said rod, said extension platform having longitudinally extending channel irons, said bolts being adapted to connect said channel irons to said first named platform, said bolt moving means being adapted to move said bolts into or out of engagement with said irons.

2. In combination, a rod, a platform pivotally secured to said rod, a second platform pivotally secured to said rod and constituting an extension to said first named platform, said first named platform having longitudinally extending members, said second named platform having longitudinally extending channel irons, said irons being adapted to lie adjacent to and on the outside of said members, and means carried by said first named platform for securing said channel irons to said members, said means comprising a plate rotatably secured to said first named platform, a lever for swinging said plate, and locking bolts slidably carried by said members and being adapted to be moved under said channel irons, said bolts being operatively secured to said plate.

3. The combination with a wagon dump comprising a platform and a rod pivotally supporting said platform, of an extension comprising a pair of channel irons pivotally secured to said rod, locking bolts carried by said platform and being adapted to project beneath said channel irons, whereby said extension is connected to said platform and forming contiguous portions therefor, and means for securing said bolts in extended position whereby said extension is rigidly locked to said platform.

ELI D. McCULLOUGH.
ARCHIE W. BUTCHER.